United States Patent
Luna et al.

(10) Patent No.: US 10,353,047 B2
(45) Date of Patent: Jul. 16, 2019

(54) DEVICE LOCATION DETERMINED BY WIRELESS SIGNALS

(71) Applicant: Lenovo (Singapore) Pte. Ltd., Singapore (SG)

(72) Inventors: Joaquin F. Luna, Durham, NC (US); Rod D. Waltermann, Rougemont, NC (US); Joseph Bryan Morris, Cary, NC (US); Erin Carolyn Solfiell Acquesta, Apex, NC (US); Timothy Winthrop Kingsbury, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 234 days.

(21) Appl. No.: 14/744,739

(22) Filed: Jun. 19, 2015

(65) Prior Publication Data
US 2016/0373897 A1 Dec. 22, 2016

(51) Int. Cl.
| | |
|---|---|
| *G01S 5/02* | (2010.01) |
| *H04W 4/029* | (2018.01) |
| *H04W 64/00* | (2009.01) |
| *H04W 4/021* | (2018.01) |
| *H04W 4/02* | (2018.01) |

(52) U.S. Cl.
CPC ............ *G01S 5/0252* (2013.01); *H04W 4/029* (2018.02); *H04W 4/021* (2013.01); *H04W 4/025* (2013.01); *H04W 64/00* (2013.01); *H04W 64/003* (2013.01)

(58) Field of Classification Search
CPC ....... H04W 64/00; H04W 4/025; H04W 4/04; H04W 64/003; H04W 4/028; H04W 4/021

USPC ................................ 455/414.1, 456.1–456.6
See application file for complete search history.

(56) References Cited

U.S. PATENT DOCUMENTS

| | | | | |
|---|---|---|---|---|
| 8,150,367 | B1 * | 4/2012 | Malladi | G01S 5/02 |
| | | | | 455/404.2 |
| 9,386,414 | B1 * | 7/2016 | Mayor | H04W 4/02 |
| 2007/0176741 | A1 * | 8/2007 | Montenegro | H04L 63/107 |
| | | | | 340/5.83 |
| 2013/0281122 | A1 * | 10/2013 | Zelinka | H04W 64/00 |
| | | | | 455/456.3 |
| 2014/0171126 | A1 * | 6/2014 | Mayor | G01S 5/14 |
| | | | | 455/456.6 |
| 2014/0179341 | A1 * | 6/2014 | Sydir | H04W 64/00 |
| | | | | 455/456.1 |

(Continued)

FOREIGN PATENT DOCUMENTS

| | | |
|---|---|---|
| CN | 104125332 A | 10/2014 |
| CN | 104284014 A | 1/2015 |
| CN | 104603632 A | 5/2015 |

*Primary Examiner* — Jaime M Holliday
(74) *Attorney, Agent, or Firm* — Ference & Associates LLC

(57) ABSTRACT

One embodiment provides a method, including: obtaining a list of detected wireless signals; determining, using a processor, that a previous list of detected wireless signals shares at least some commonality with the list of detected wireless signals; for common entries in the list, analyzing with a processor, a characteristic of an entry of the list of detected wireless signals and a characteristic of an entry of the previous list of detected wireless signals; establishing, if the similarity metric meets a criterion, an estimated location of a device; and requesting, from a third party location service, a device location if the similarity metric does not meet the criterion. Other aspects are described and claimed.

20 Claims, 3 Drawing Sheets

(56) References Cited

U.S. PATENT DOCUMENTS

2015/0271639 A1\* 9/2015 Ziskind ................ H04W 4/028
 455/456.1
2016/0205652 A1\* 7/2016 Shu ....................... H04W 64/00
 455/456.1

\* cited by examiner

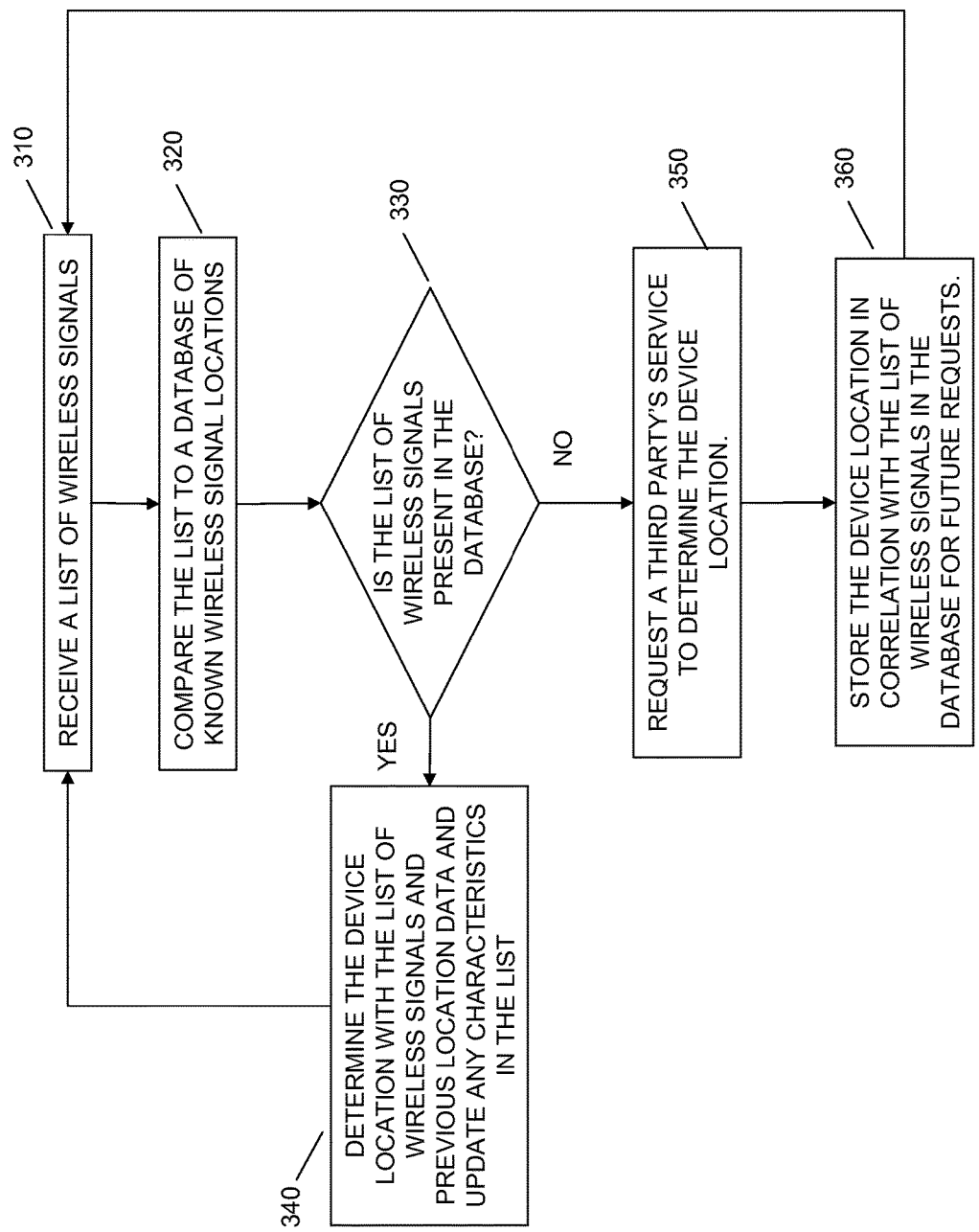

DEVICE LOCATION DETERMINED BY WIRELESS SIGNALS

BACKGROUND

The average individual likely utilizes multiple mobile technology applications daily. Some of those applications may be tools to help the user in various ways (e.g., communicating, information gathering, directional navigation, etc.). As applications have become more complicated and advanced with regard to their features, they have gained the ability to process more and more information to further enhance their abilities.

One source of information required for many applications is device location, and by extension the user's location. This allows certain applications to function more efficiently (e.g., if a user is searching for a restaurant, the device application can narrow the recommendations based on the user's location). Although there are a variety of ways to retrieve a user's location information, (e.g., GPS, Glonass, Galileo, multilateration of radio signals between cellular towers, Wi-Fi connections, etc.) some are more robust or cost effective than others. Determining user location based on wireless signals like Wi-Fi is a useful alternative when the user is in a building or otherwise unable to acquire a satellite based location service. However, building a reliable database of the millions of wireless access point locations is extremely complex, and thus only a few large organizations have the capability. This can lead to a high price point for access to the most accurate of these services.

BRIEF SUMMARY

In summary, one aspect provides a method, comprising: obtaining a list of detected wireless signals; determining, using a processor, that a previous list of detected wireless signals shares at least some commonality with the list of detected wireless signals; for common entries in the list, analyzing with a processor, a characteristic of an entry of the list of detected wireless signals and a characteristic of an entry of the previous list of detected wireless signals; establishing, if the similarity metric meets a criterion, an estimated location of a device; and requesting, from a third party location service, a device location if the similarity metric does not meet the criterion.

Another aspect provides an information handling device, comprising: a processor; a memory device that stores instructions executable by the processor to: obtain a list of detected wireless signals; determine that a previous list of detected wireless signals shares at least some commonality with the list of detected wireless signals; for common entries in the list, analyzing a characteristic of an entry of the list of detected wireless signals and a characteristic of an entry of the previous list of detected wireless signals; establish, if the similarity metric meets a criterion, an estimated location of a device; and requesting, from a third party location service, a device location if the similarity metric does not meet the criterion.

A further aspect provides a product, comprising: a storage device having code stored therewith, the code being executable by a processor and comprising: code that obtains a list of detected wireless signals; code that determines that a previous list of detected wireless signals shares at least some commonality with the list of detected wireless signals; for common entries in the list, analyzing a characteristic of an entry of the list of detected wireless signals and a characteristic of an entry of the previous list of detected wireless signals; code that establishes, if the similarity metric meets a criterion, an estimated location of a device; and code that requests, from a third party location service, a device location if the similarity metric does not meet the criterion.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of determining a device location based on detected wireless signals.

DETAILED DESCRIPTION

Figure 1:
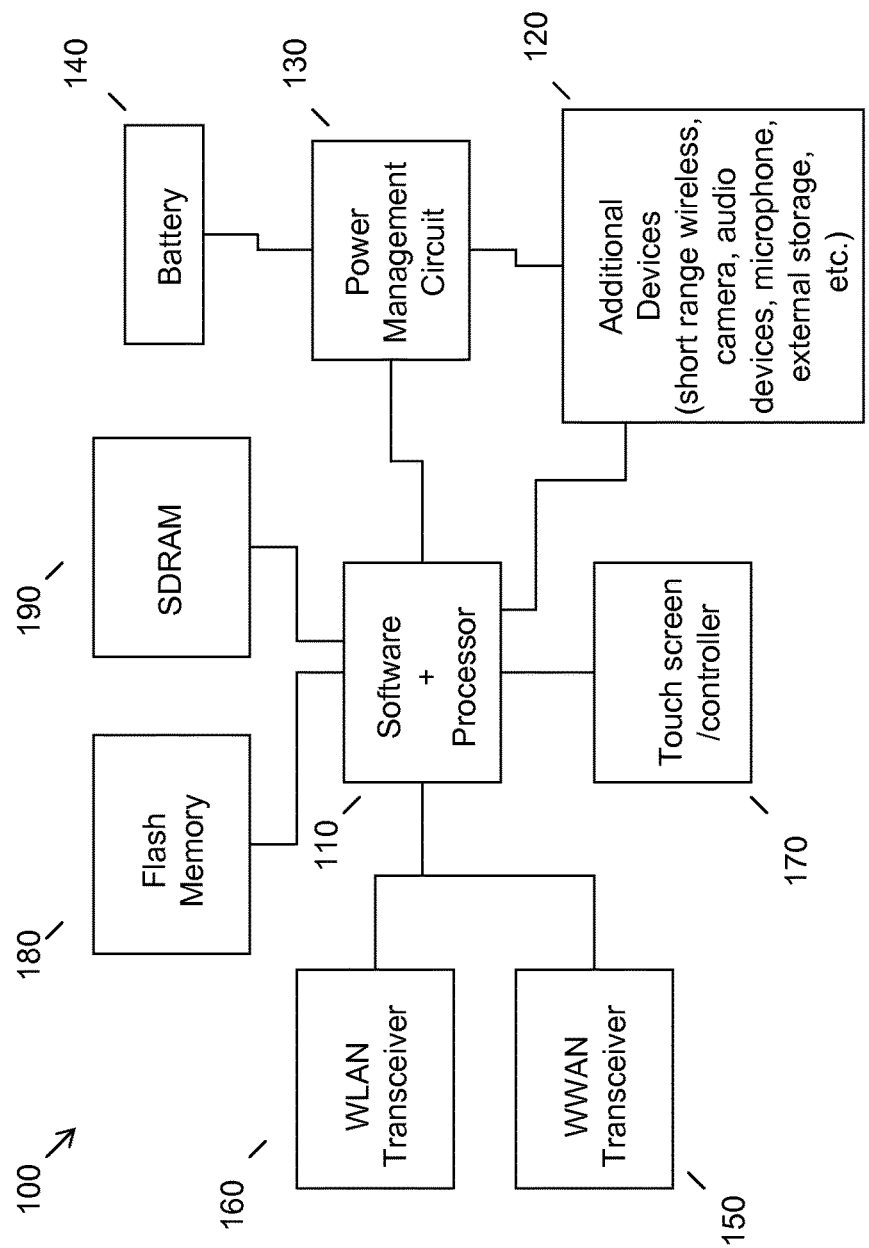
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As devices become more mobile, users are more likely to carry them at all times. Within the last ten years, the use of smartphones has exploded across all demographics. Today almost every person walking down a street in the United States likely has a mobile communication device on their person. Because of this new mobile era, location based services have become almost vital to our use of mobile devices. Location based services use information relating to the geographical position of a device to determine various factors and actions. For example, if a user requested a location of a coffee shop, the location based services would ensure that only coffee shops within the user's proximity are suggested.

Although as mentioned, many different methods of determining location exist, (e.g., GPS, Glonass, Galileo, multi-lateration of radio signals between cellular towers, Wi-Fi connections, etc.) each has its own set of drawbacks. The most readily used systems are satellite based (e.g., Global Positioning System (GPS)). However, because these systems rely on satellites to triangulate the position of a device they can have difficulty due to multipath issues or when there is no clear path to the sky (e.g., when the user is in the building, underground, or experiencing heavy cloud cover). Alternatively, some current solutions that do not use triangulation to calculate the locations of devices may suffer from a major decrease of precision and accuracy.

One alternative to GPS is the use of Wi-Fi connections to determine location. Wi-Fi based position systems (WPS) make use of the rapid expansion of wireless access points in the last ten to fifteen years. Generally, Wi-Fi based positioning is based on wireless access points, the intensity of the received signal and a method of fingerprinting. The fingerprinting generally involves an information gathering process that records the Service Set Identifier (SSID), media access control (MAC) address, and the physical location of the access points. This fingerprinting is done over a long period of time for an extremely large number of access points. Each access point's information is then recorded and stored in a database which can then be indexed and searched so that matches can be determined. Thus allowing a device to know its location based on the previously known physical location of the access points.

However, in order to build a reliable database of network access points, an immense amount of data gathering is required. Because of how large of an undertaking this is, only a handful of organizations have up-to-date reliable databases. This enables these few organizations to charge a premium for their service. Currently, devices can geo-locate themselves using these third party services (e.g., from Google or Microsoft). The devices may provide beacon data to the third party service, and in return receive a location that was previously triangulated by the third party service. These third party services can be costly for each query, which quickly builds up cost over time. In many circumstances, a user may be visiting the same small set of locations repeatedly. Thus, a solution is needed to solve the problem of a device requiring multiple geo-location queries for the same location and driving up costs.

For devices that require geo-location, but do not have satellite capabilities, the traditional solution is to triangulate a position from the beacon information. This requires an exhaustive database of the positions of wireless access points, such as Wi-Fi and cell towers. As stated earlier, collecting this data can require millions of devices and years of collection time. Thus, it can be overly burdensome on any organization or individual who desires this information to make use of a similar kind of service.

The technical issue presents problems for those that may wish to utilize this information for location based services. Accordingly, an embodiment provides a method of receiving from a user device a list of all the available wireless signals in the detectable area. Theses signals are then compared against a database. If the list of wireless signals is present in the database, the previously recorded location is assigned allowing the location based services can function properly. However, in the case that the location can not be determined through the use of the database, a request is sent to one of the large third party services to determine the device location. Once this location is determined, it is then used for the location based services and recorded in the database. Through this process, a user will not be forced to pay for the third party service upon their subsequent visits to the location.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
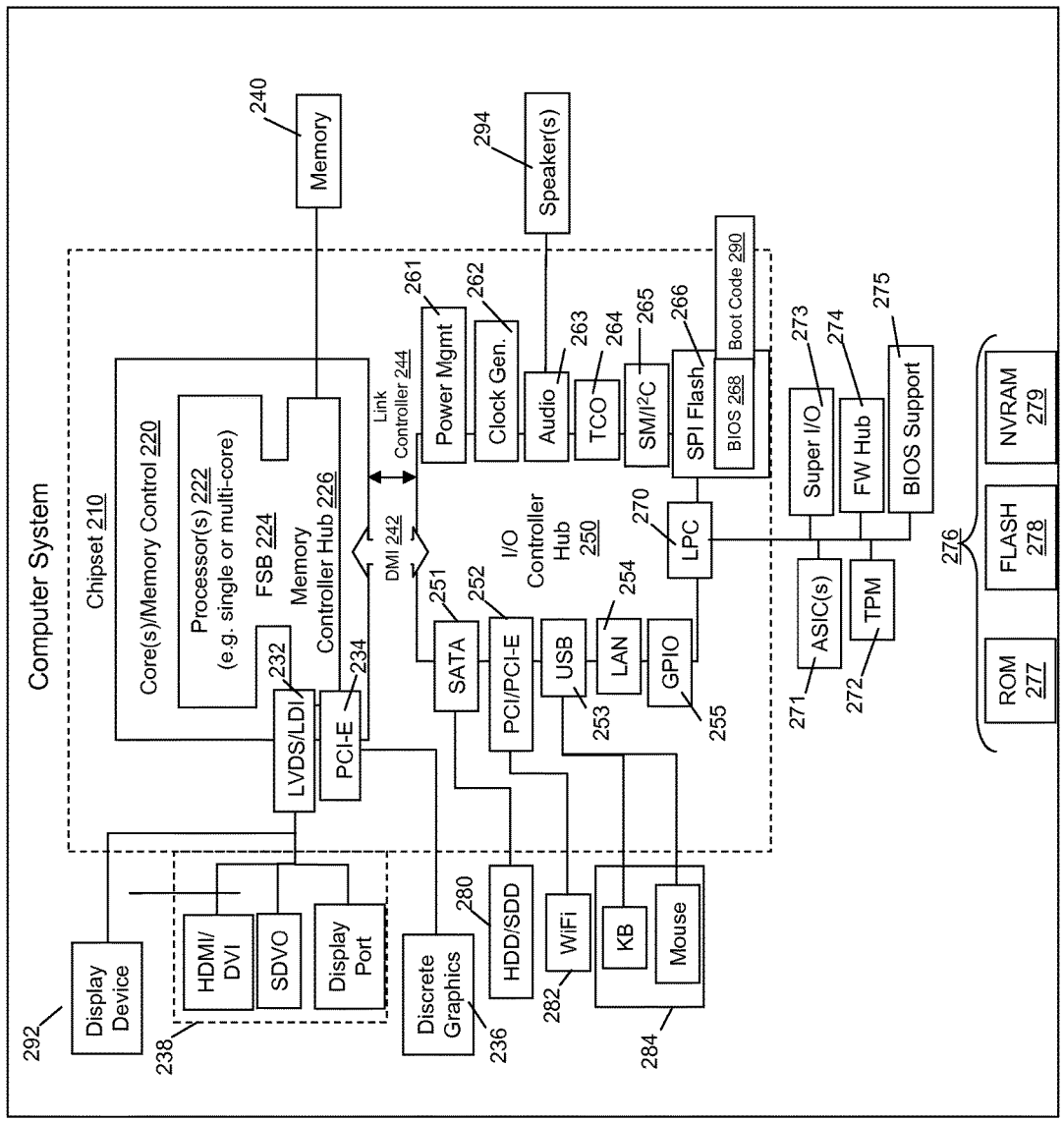
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (U.S.) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may carry with them throughout the day and may require location based services. For example, the circuitry outlined in FIG. 1 may be implemented in a tablet or smart phone embodiment, whereas the circuitry outlined in FIG. 2 may be implemented in a personal computer embodiment.

Referring now to FIG. 3, an embodiment receives a list of one or more wireless signals at 310. The wireless signals could be any type of wireless signal (e.g., Wi-Fi, Bluetooth, cellular, etc.). An embodiment may or may not directly connect to a wireless access point to be included in the list. The received list may comprise the SSID of the wireless signal, a MAC address of the wireless access point, whether or not the wireless signal is encrypted or open, the physical location of the access point, and any other desired information that is ascertainable.

Once a full list of every available signal is created, the list is compared against a database that contains every previous list queried at 320. The database itself is generated through a process of collection every time a user or users visit a location. In an embodiment, the database can be device specific (e.g., only locations previously geo-located by the device are stored) or across multiple device. Additionally, an embodiment may store the database locally on the device, or remotely (e.g., in a cloud based service). In an embodiment where the database is stored remotely, a community of users could contribute to the database. This crowd sourcing ability would allow the database to grow more quickly and enable a user to visit a location previously unvisited by themselves yet still obtain their location data (e.g., when another community member has already geo-located a device and stored a list of the wireless signals in proximity).

Once the list of wireless signals is received at 310 and a comparison is made with the database at 320, it is determined if the list of wireless signals is present in the database or not at 330. This is done through a statistical analysis of the wireless signals contained in both the list and the database. Various characteristics of the wireless signals (e.g., entry overlap, signal strength, statistical threshold, etc.) are analyzed for any common entries within the database. For example, many wireless access points come with a default SSID characteristic. Thus, it may be possible for many wireless access points to have a similar SSID, which can cause potential issues within the database comparison. The use of MAC addresses the additional characteristics, such as those mentioned above, allow for a differentiation of wireless signals.

As new wireless access points come online and older access points are decommissioned or renamed, it can become difficult to get an identical match regarding a previously visited area. However, the failure of a single access point to be included in the list should not result in a determination that no match exists. Thus, a statistical analysis allows for a successful match if a portion of the access points remain available.

In order for the statistical analysis of the characteristics to be effective, an embodiment may require a minimum number of available access points. This predetermined threshold of n number of devices (e.g., requiring the list contain at least there wireless access points) may be determined by a manufacturer or user setting. The setting may be stored on the local device or in a cloud service similar to the database storage. In addition to a minimum threshold, an embodiment may be able to determine the device location with higher accuracy based on an increase in the number of available wireless signals (i.e., the more wireless signals available in an area the more precise the geo-location will be).

If a determination is made that the list of wireless signals is not present in the data base at 330, an embodiment may request access to a third party service at 350. As discussed above, a small collection of organizations have managed to collect and maintain vast quantities of information regarding wireless signal access points. A few of the organizations open their databases to the public, but some of the largest and most robust reside behind a pay service. Thus, if another organization or individual needs to reference one of these robust databases a fee is collected from the entity maintaining the database.

Once the third party has provided a determination of the device location at 350, the information (e.g., SSID, MAC, physical location access points, etc.) is stored in the database for future reference at 360. For example, if a user visits a coffee shop for the first time, the database may not contain any of the available wireless signals. Thus the user or application service would be required to pay the third party service for location information. However, when the user (or a user in that user's community) visits that same coffee shop at a later date, the database will contain the geo-location as well as the correlating wireless signals.

Thus, in an embodiment, if a user visits a location they have previously visited, the database will be able to perform a geo-location of the device. However, as previously mentioned, wireless signals can be created, destroyed, or modified over time. Thus, when the list of wireless signals is received at 310 it may only consist of a portion of the previously determined list. However, due to the statistical analysis that is carried out in the comparison step at 320, a positive identification of the geo-location within the database is still possible at 330.

Therefore, now that the database has the wireless signal information, the device location is able to be determined based solely on the signal records present in the database at 330. This allows the device location to be determined without the added cost of the third party request at 340. In addition to reporting the device location, the current database may be updated with any changes in the available wireless signals. For example, if a new wireless signal is discovered at the previously visited coffee shop, it will be recorded similar to the previous signals (e.g., SSID, MAC, physical location access points, etc.) and added to the database so that any subsequent comparisons can be as accurate as possible.

Accordingly, as illustrated by the example embodiments and figures, an embodiment detects available wireless signals in the proximity of a device, compiles those signals into a list and compares that list against a database comprising all previously recorded wireless signals and their physical location. If a determination is made that the list of wireless signals in proximity is unknown, a request is sent to a third party service to request assistance is determining the device's location. Once the location is determined, the wireless signals are stored in the database along with the third party determined location, thus ensuring future visits this location do not require the third party service.

The various embodiments described herein thus represent a technical improvement to the current method of constantly paying for the third party service. Additionally, once the wireless signals are associated with the geo-location in the database, subsequent visits to the location allow for continuous updating the database. This ensures a high level of accurately and reduces the cost associated with the third party service while still allowing application's location based services to perform properly.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   obtaining a list of wireless signals detected at an information handling device;
   comparing, using a processor, the detected list of wireless signals against a database stored at a data storage location locally accessible by the information handling device and containing at least one list of previously detected wireless signals each having an associated location;
   determining, using a processor, a similarity metric between the detected list of wireless signals and the database, wherein the determining comprises identifying a predetermined number of entries within the database, the predetermined number of entries being associated with a location, having a similarity to the list of obtained wireless signals and identifying at least one of entry associated with the location does not match the obtained list of wireless signals;

identifying, based upon the similarity metric meeting a criterion, an estimated location of the information handling device based upon the identified predetermined number of entries having a similarity to the obtained wireless signals and identifying the location associated with the identified entries in common;

identifying, based upon the similarity metric not meeting a criterion, a location of the information handling device by requesting the location from a third party service provider; and updating, the data storage location locally accessible by the information handling device, the at least one entry associated with the location using at least one of: information received with the obtained list of wireless signals and information received from the third party service provider.

2. The method of claim 1, wherein the database is stored on the device.

3. The method of claim 2, wherein the device is a cloud server.

4. The method of claim 3, wherein the database is shared with other devices.

5. The method of claim 1, wherein the comparing comprises identifying entry overlap.

6. The method of claim 1, wherein the similarity is based upon signal strength.

7. The method of claim 1, wherein the criterion comprises a threshold.

8. The method of claim 7, wherein the threshold is a statistical threshold and the statistical threshold includes two standard deviations.

9. The method of claim 1, wherein the list of detectable wireless signals comprises a MAC address.

10. The method of claim 1, wherein the list of detectable wireless signals comprises a wireless access point SSID.

11. An information handling device, comprising:
a processor;
a memory device that stores instructions executable by the processor to:
obtain a list of wireless signals detected at an information handling device;
compare the detected list of wireless signals against a database stored at a data storage location locally accessible by the information handling device and containing at least one list of previously detected wireless signals each having an associated location;
determine a similarity metric between the detected list of wireless signals and the database, wherein the determining comprises identifying a predetermined number of entries within the database, the predetermined number of entries being associated with a location, having a similarity to the list of obtained wireless signals and identifying at least one of entry associated with the location does not match the obtained list of wireless signals;
identify, based upon the similarity metric meeting a criterion, an estimated location of the information handling device based upon the identified predetermined number of entries having a similarity to the obtained wireless signals and identifying the location associated with the identified entries in common;
identify, based upon the similarity metric not meeting a criterion, a location of the information handling device by requesting the location from a third party service provider; and
update, the data storage location locally accessible by the information handling device, the at least one entry associated with the location using at least one of: information received with the obtained list of wireless signals and information received from the third party service provider.

12. The information handling device of claim 11, wherein the database is stored on the device.

13. The information handling device of claim 12, wherein the device is a cloud server.

14. The information handling device of claim 13, wherein the database is shared with other devices.

15. The information handling device of claim 11, wherein the comparing comprises identifying entry overlap.

16. The information handling device of claim 11, wherein the similarity is based upon signal strength.

17. The information handling device of claim 11, wherein the criterion comprises a threshold.

18. The information handling device of claim 17, wherein the threshold is a statistical threshold and the statistical threshold includes two standard deviations.

19. The information handling device of claim 11, wherein the list of detectable wireless signals comprises at least one of a MAC address and a SSID.

20. A product, comprising:
a storage device having code stored therewith, the code being executable by a processor and comprising:
code that obtains a list of wireless signals detected at an information handling device;
code that compares the detected list of wireless signals against a database associated with the information handling device and containing at least one list of previously detected wireless signals each having an associated location;
code that determines a similarity metric between the detected list of wireless signals and the database, wherein the determining comprises identifying a predetermined number of entries within the database, the predetermined number of entries being associated with a location, having a similarity to the list of obtained wireless signals and identifying at least one of entry associated with the location does not match the obtained list of wireless signals;
code that identifies, based upon the similarity metric meeting a condition, an estimated location of the information handling device based upon the identified predetermined number of entries having a similarity to the obtained wireless signals and identifying the location associated with the identified entries in common;
code that identifies, based upon the similarity metric not meeting a criterion, a location of the information handling device by requesting the location from a third party service provider; and
code that updates, the data storage location locally accessible by the information handling device, the at least one entry associated with the location using at least one of: information received with the obtained list of wireless signals and information received from the third party service provider.

* * * * *